US009382930B2

(12) United States Patent  (10) Patent No.: US 9,382,930 B2
Taylor et al.  (45) Date of Patent: Jul. 5, 2016

(54) COMPRESSION LIMITER WITH RETENTION FEATURES

(71) Applicants: Alan C. Taylor, Lake Orion, MI (US); Donald D. Cooper, Fond Du Lac, WI (US)

(72) Inventors: Alan C. Taylor, Lake Orion, MI (US); Donald D. Cooper, Fond Du Lac, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 175 days.

(21) Appl. No.: 14/336,739

(22) Filed: Jul. 21, 2014

(65) Prior Publication Data

US 2014/0328648 A1  Nov. 6, 2014

Related U.S. Application Data

(62) Division of application No. 13/384,707, filed as application No. PCT/US2010/042843 on Jul. 22, 2010, now Pat. No. 8,789,404.

(60) Provisional application No. 61/227,992, filed on Jul. 23, 2009.

(51) Int. Cl.
  *F16B 43/02* (2006.01)
  *F16B 5/02* (2006.01)
  *B22F 3/02* (2006.01)
  (Continued)

(52) U.S. Cl.
  CPC . *F16B 5/025* (2013.01); *B22F 3/02* (2013.01); *F16B 19/02* (2013.01); *F16B 41/002* (2013.01); *B22F 2003/031* (2013.01); *B22F 2003/033* (2013.01)

(58) Field of Classification Search
  CPC ........ F16B 5/025; F16B 19/02; F16B 41/002; F16B 43/02; F16L 5/10; B60R 16/0222
  USPC ...................... 411/531, 533, 538, 546; 16/2.1
  See application file for complete search history.

(56) References Cited

U.S. PATENT DOCUMENTS 3,688,717 A  9/1972 Rudolph et al.
3,694,127 A  9/1972 Takahashi et al.
(Continued)

FOREIGN PATENT DOCUMENTS

CN  1518643 A  8/2004
JP  H06173988 A  6/1994

OTHER PUBLICATIONS

PCT International Search Report and Written Opinion, PCT/US2010/042843, Sep. 16, 2010, 4 pages.
(Continued)

*Primary Examiner* — Roberta Delisle
(74) *Attorney, Agent, or Firm* — Quarles & Brady LLP

(57) ABSTRACT

A compression limiter is disclosed that comprises an upper surface and a lower surface. The compression limiter further comprises an inner surface that defines a passageway configured to accommodate a fastener and an outer surface configured to engage a structure in which the compression limiter is placed. A first retainer projects outwardly from the outer surface and includes a first retention surface that has at least a planar portion. The first retainer further includes an undercut surface disposed inwardly from the first retention surface so as to create a corner extending in a direction with at least a component perpendicular to the longitudinal direction. A method of forming the compression limiter is also disclosed.

17 Claims, 14 Drawing Sheets

(51) Int. Cl.
*F16B 19/02* (2006.01)
*F16B 41/00* (2006.01)
*B22F 3/03* (2006.01)

(56) References Cited

U.S. PATENT DOCUMENTS

| | | | |
|---|---|---|---|
| 3,807,913 | A | 4/1974 | Brede, III et al. |
| 3,842,646 | A | 10/1974 | Kuhn |
| 4,143,696 | A | 3/1979 | Holton et al. |
| 4,153,399 | A | 5/1979 | DeSantis |
| 4,289,061 | A | 9/1981 | Emmett |
| 4,470,286 | A | 9/1984 | Asari et al. |
| 4,579,258 | A | 4/1986 | Brown et al. |
| 6,174,118 | B1 | 1/2001 | Rebers et al. |
| 6,457,925 | B1 | 10/2002 | Genick, II |
| 6,609,717 | B2 | 8/2003 | Hinson |
| 7,013,696 | B2 | 3/2006 | Ando et al. |
| 7,396,198 | B2 | 7/2008 | Schultz |
| 8,337,132 | B2 * | 12/2012 | Steffenfauseweh .. B60Q 1/0433 403/408.1 |
| 8,413,479 | B2 | 4/2013 | Knott |
| 8,641,347 | B2 * | 2/2014 | Bisset ................. F16B 31/02 411/371.2 |
| 8,679,667 | B2 * | 3/2014 | Phlegm ............ H01M 10/0413 264/1.1 |
| 8,789,404 | B2 * | 7/2014 | Taylor ................. B22F 3/02 72/344 |
| 2003/0086772 | A1 | 5/2003 | Giannakakos |
| 2006/0008376 | A1 | 1/2006 | Olsson |
| 2007/0158918 | A1 | 7/2007 | Belter |
| 2007/0248433 | A1 | 10/2007 | Schultz |
| 2008/0157483 | A1 | 7/2008 | Booher et al. |
| 2010/0083782 | A1 | 4/2010 | Cheisa et al. |

OTHER PUBLICATIONS

Japan Patent Office, Notification of Rejection Reasons, Application No. 2012-521771, Feb. 25, 2014, 5 pages.
Japan Patent Office, Notification of Reason for Refusal, Application No. 2012-521771, May 27, 2014, 3 pages.
The State Intellectual Property Office of the People's Republic of China, First Office Action and Search Report, Application No. 201080033711.9, Jun. 28, 2013, 26 pages.

* cited by examiner

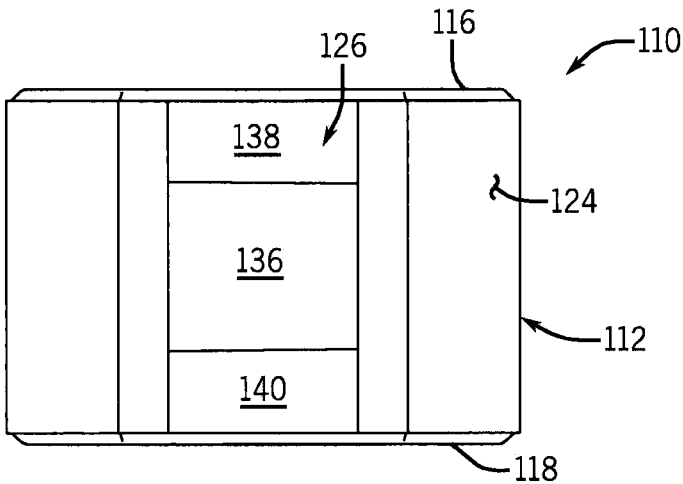
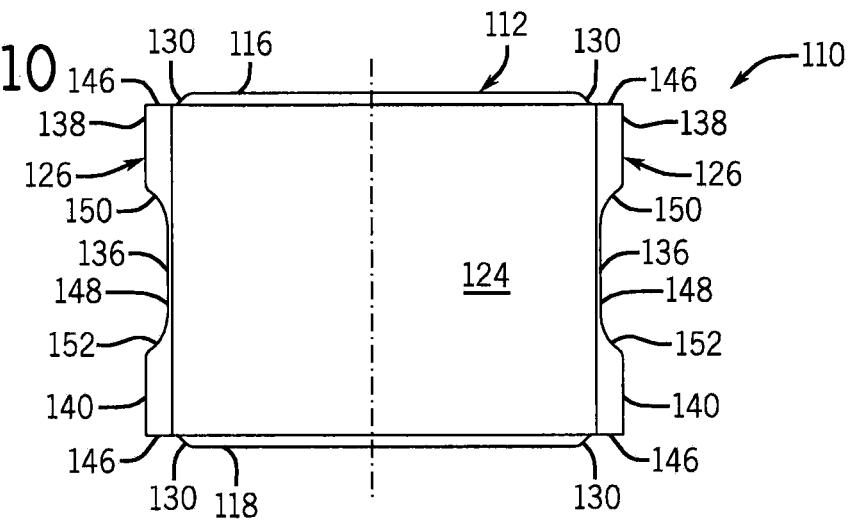
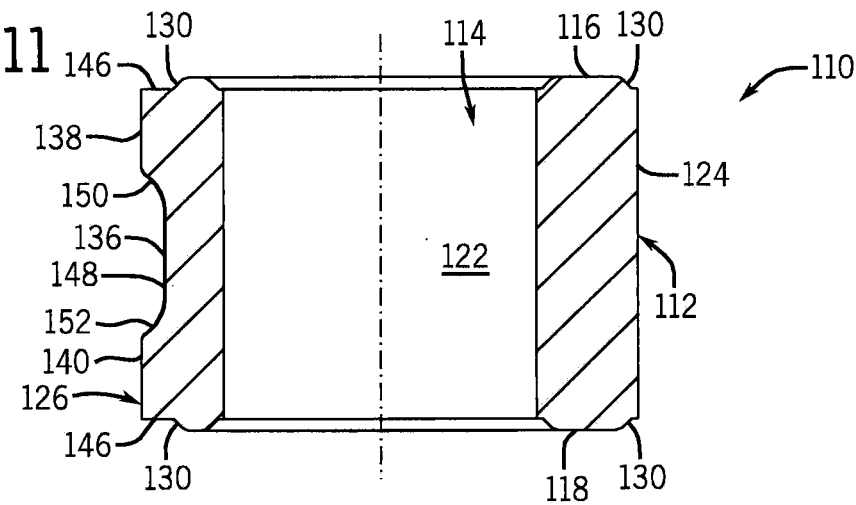

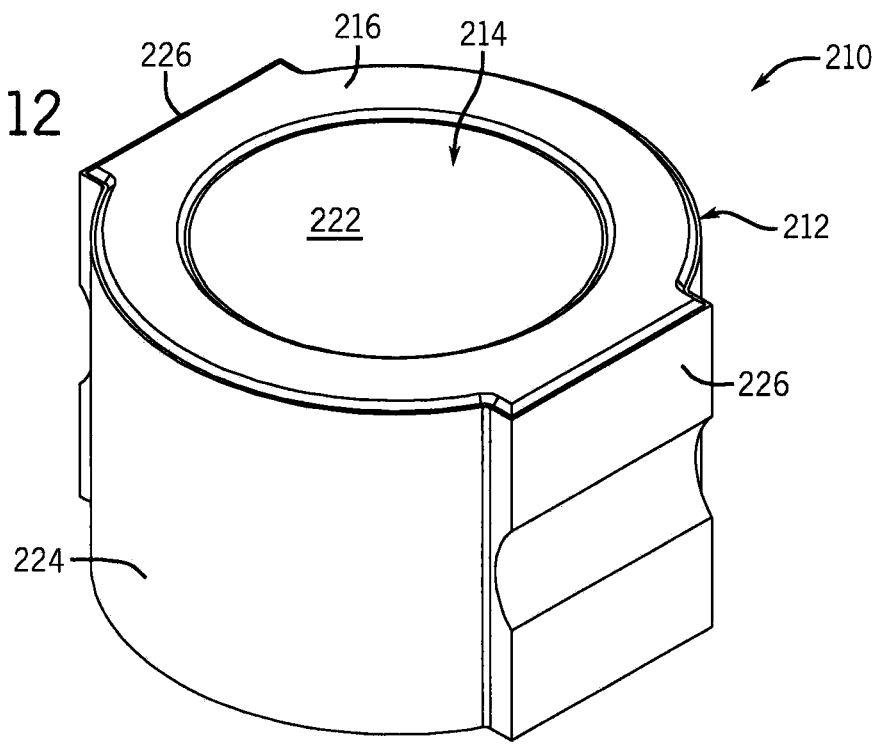
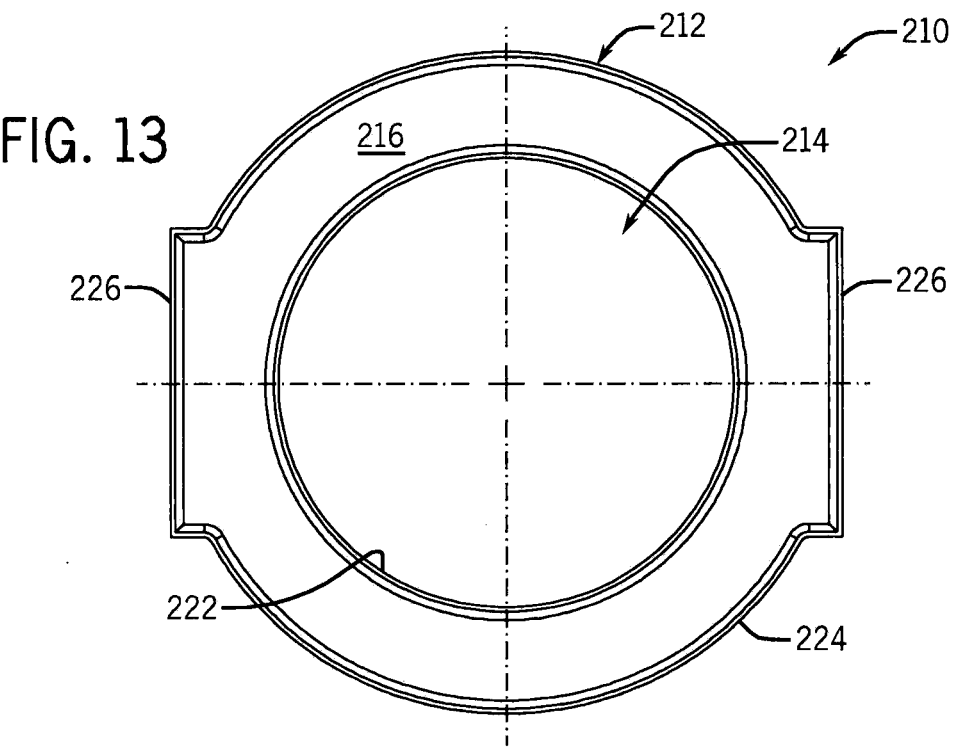

COMPRESSION LIMITER WITH
RETENTION FEATURES

CROSS-REFERENCE TO RELATED
APPLICATION

This application is a divisional of U.S. application Ser. No. 13/384,707 filed Jan. 18, 2012, which is a national stage entry of PCT International Application No. PCT/US2010/042843 filed Jul. 22, 2010, which claims the benefit of the filing date of U.S. Provisional Patent Application No. 61/227,992 filed Jul. 23, 2009, all of which are incorporated herein by reference for all purposes.

STATEMENT CONCERNING FEDERALLY
SPONSORED RESEARCH OR DEVELOPMENT

Not applicable.

FIELD OF THE INVENTION

This invention relates to compression limiters, and particularly compression limiters for automotive assemblies.

BACKGROUND OF THE INVENTION

Fasteners are often used to connect a plastic component to another component in various types of assemblies, especially automotive assemblies. However, the fastener must usually be loaded to an extent that would cause the plastic component to quickly deform, fracture or creep over time, thereby reducing the load carried by the fastener. As such, a metal compression limiter (sometimes simply referred to as a bushing or insert) is commonly used in assemblies in which a compressive load is applied to a plastic component. The compression limiter strengthens the plastic component and resists the load applied by the fastener. Therefore, the integrity of the plastic is not compromised and the compression limiter reduces creep of the plastic component.

Typically, a compression limiter has a tubular shape with an outer surface that engages the plastic component. The inner surface of the compression limiter defines a passageway that accommodates the fastener. Most simple compression limiters do not include additional features; as such, the compression limiter may fall out of the plastic component during manufacturing if the compression limiter is inserted by overmolding or press-fitting. To address this problem, some compression limiters include retaining features to provide a more secure connection to the plastic component. For example, some compression limiters include a flanged end that engages a surface of the plastic component outside the hole. Other designs include perforations into which the plastic component flows during an overmolding process.

However, the retention features of the aforementioned designs typically require additional processing steps that significantly increase the overall manufacturing time, and therefore cost, of the compression limiter. For example, some compression limiters are perforated by a punch and then moved to another tooling assembly to be rolled into a cylindrical shape. Considering the limitations of previous designs, a need exists for an improved compression limiter that is easily manufactured.

SUMMARY OF THE INVENTION

In one aspect, the present invention provides a compression limiter that comprises an upper surface and a lower surface. A distance between the lower surface and the upper surface defines a longitudinal direction. The compression limiter further comprises an inner surface that defines a passageway configured to accommodate a fastener and an outer surface configured to engage a structure in which the compression limiter is placed. A distance between the outer surface and the inner surface defines a radial direction perpendicular to the longitudinal direction. The compression limiter further comprises a first retainer that projects outwardly from the outer surface. The first retainer includes a first retention surface that has at least a planar portion perpendicular to the radial direction. The first retainer further includes an undercut surface disposed radially inwardly from the first retention surface so as to create a corner extending in a direction with at least a component perpendicular to the longitudinal direction.

In another aspect, the present invention provides a method for forming the compression limiter from powder metal. The method includes the step of pressing the powder metal in a longitudinal direction with a movable punch and thereby shaping an outer surface of the compression limiter against an inner die surface of a die cavity. An inner surface of the compression limiter is shaped against a core rod disposed in the die cavity while simultaneously shaping the outer surface. A distance between the outer surface and the inner surface of the compression limiter defines a radial direction perpendicular to the longitudinal direction. A retainer projecting from the outer surface of the compression limiter is shaped against a side punch disposed in the die cavity while simultaneously shaping the outer surface. The retainer includes a first retention surface that has at least a planar portion perpendicular to the radial direction. The retainer further includes an undercut surface disposed radially inwardly from the first retention surface. The method further includes the step of removing the compression limiter from the die cavity by lowering the die cavity relative to the side punch. In some embodiments, a plurality of compression limiters are formed simultaneously in a single die cavity.

The foregoing and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 9 is a side view of the compression limiter of FIG. 7 showing a retainer;

FIG. 10 is a front view of the compression limiter of FIG. 7;

FIG. 11 is a sectional view along line 11-11 of FIG. 8;

FIG. 12 is a perspective view of a third embodiment of the compression limiter of the present invention;

FIG. 13 is a top view of the compression limiter of FIG. 12;

DETAILED DESCRIPTION OF THE PREFERRED EMBODIMENT

Figure 1:
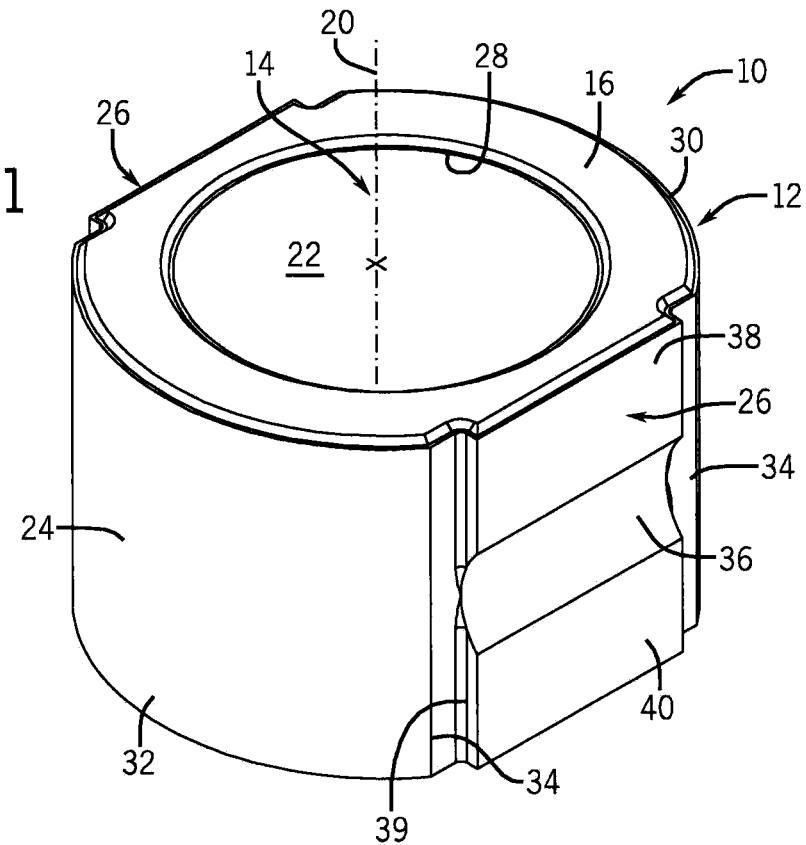
FIG. 1 is a perspective view of a compression limiter of the present invention.

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Referring now to FIGS. 1-6, a compression limiter 10 of the present invention includes a body 12 that defines a passageway 14 to accommodate a fastener (not shown). The passageway 14 extends from an upper surface 16 to a lower surface 18 in a longitudinal direction 20 defined by a distance between the upper and lower surfaces 16, 18. An inner surface 22 and an outer surface 24 opposite the inner surface 22 provide the compression limiter 10 with a generally open-cylindrical shape. One or more retainers 26 project outwardly from the outer surface 24 to secure the compression limiter 10 to the fastened component (i.e., a component in which the compression limiter 10 is press fitted, over-molded, or the like to prevent deformation due to the load applied by the fastener). These structures are described in further detail in the following paragraphs, beginning with the upper surface 16 and concluding with the retainers 26.

Still referring to FIGS. 1-6, the upper and lower surfaces 16, 18 are preferably planar surfaces that are identical to one another. Such identical surfaces, as well as other structures described in further detail below, provide the compression limiter 10 with a symmetric shape over a plane perpendicular to the longitudinal direction 20 and bisecting the compression limiter 10. That is, the compression limiter 10 may be symmetric over a horizontal plane. The upper and lower surfaces 16, 18 may further include inner shoulder surfaces 28 and outer shoulder surfaces 30 (both of which are mostly easily seen in FIG. 6) proximate the inner and outer surfaces 22 and 24, respectively. The inner shoulder surfaces 28 help position the fastener within the passageway 14. The outer shoulder surfaces 30 provide additional features to assist in securing the compression limiter 10 within the fastened component.

Figure 2:
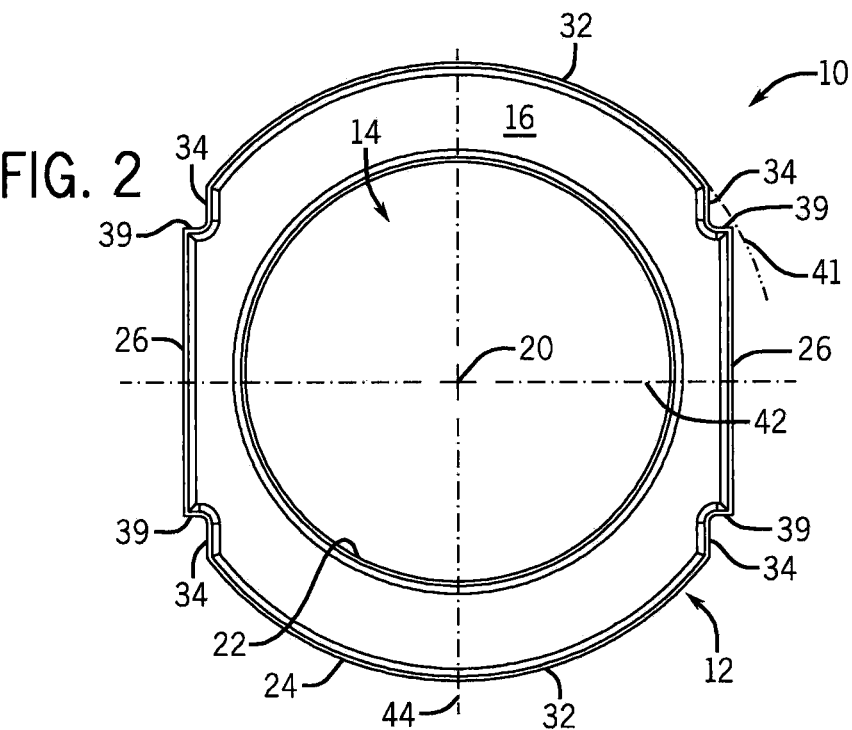
FIG. 2 is a top view of the compression limiter of FIG. 1.
Figure 3:
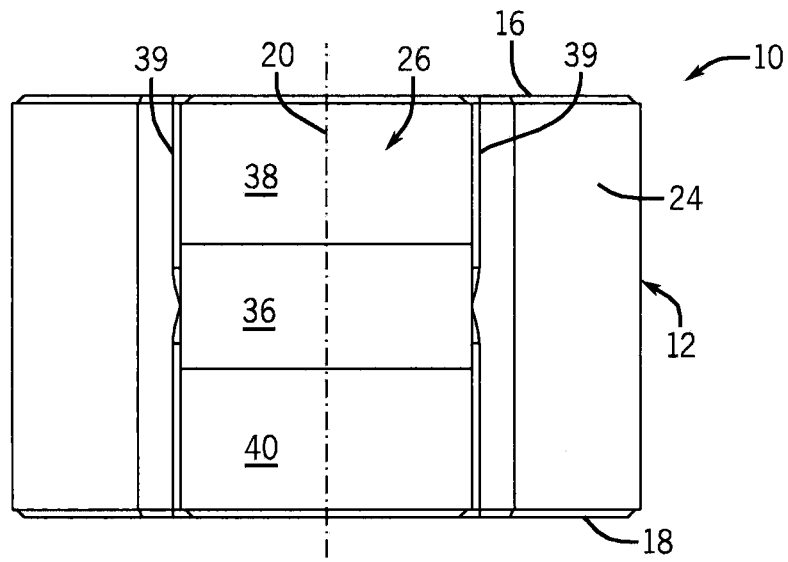
FIG. 3 is a side view of the compression limiter of FIG. 1 showing a retainer.
Figure 4:
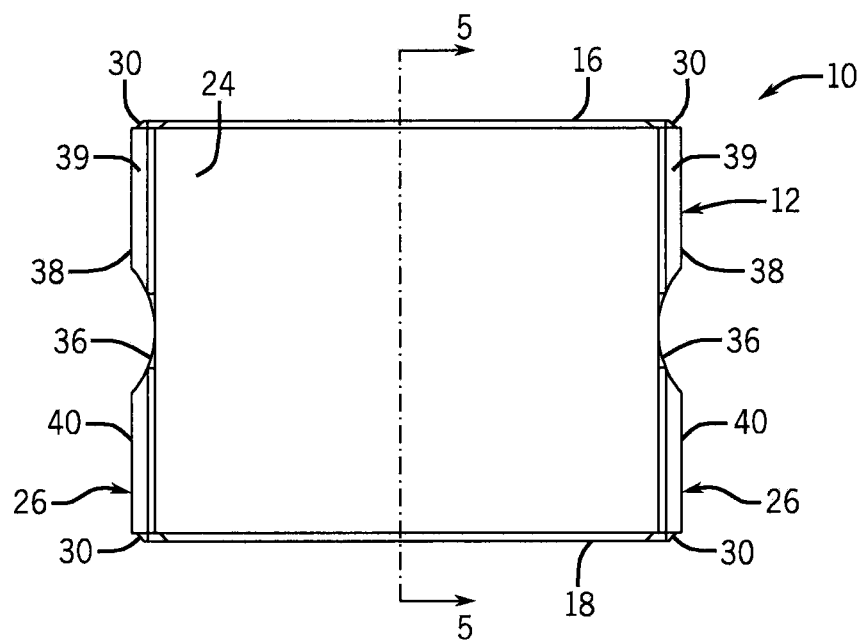
FIG. 4 is a front view of the compression limiter of FIG. 1.
Figure 5:
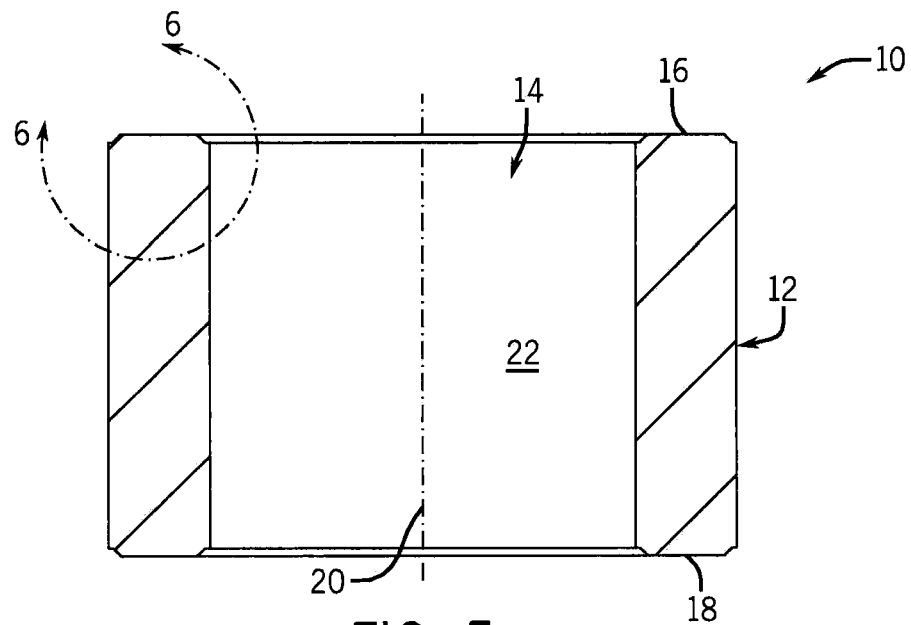
FIG. 5 is a sectional view along line 5-5 of FIG. 4.
Figure 6:
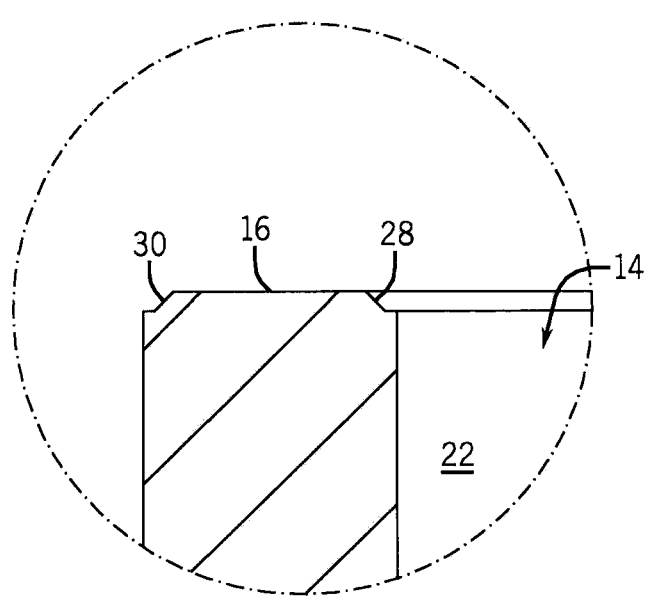
FIG. 6 is a detail view of the area enclosed by line 6-6 of FIG. 5.
Figure 7:
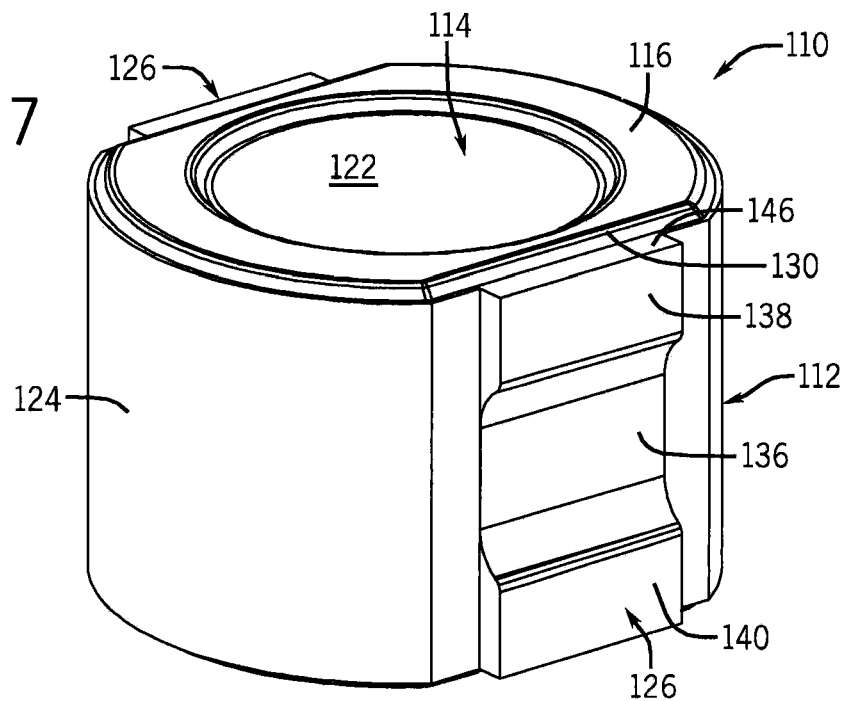
FIG. 7 is a perspective view of a second embodiment of the compression limiter of the present invention.
Figure 8:
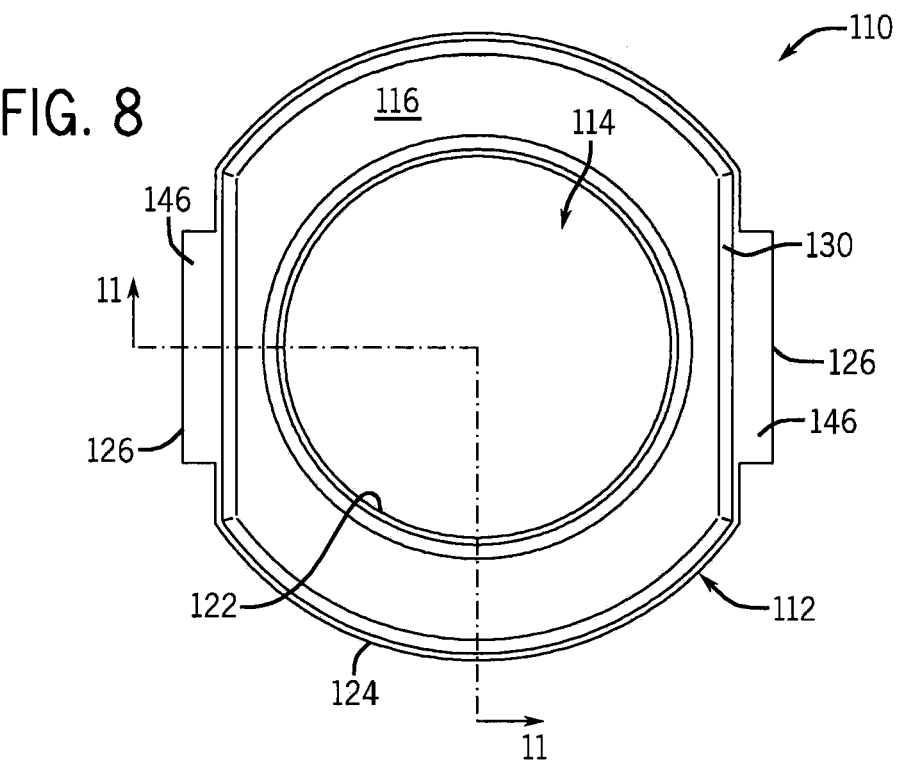
FIG. 8 is a top view of the compression limiter of FIG. 7.
Figure 14:
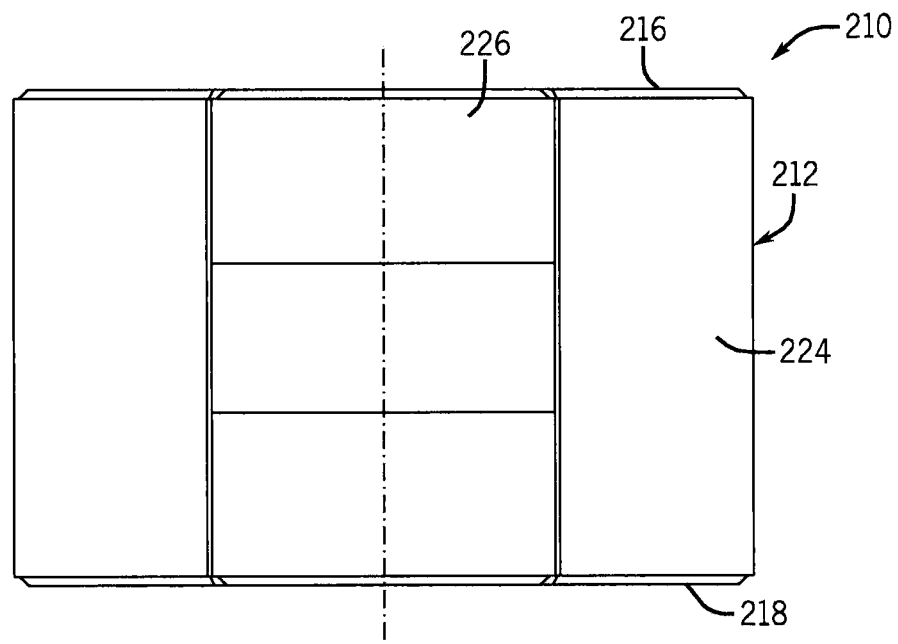
FIG. 14 is a side view of the compression limiter of FIG. 12 showing a retainer.
Figure 15:
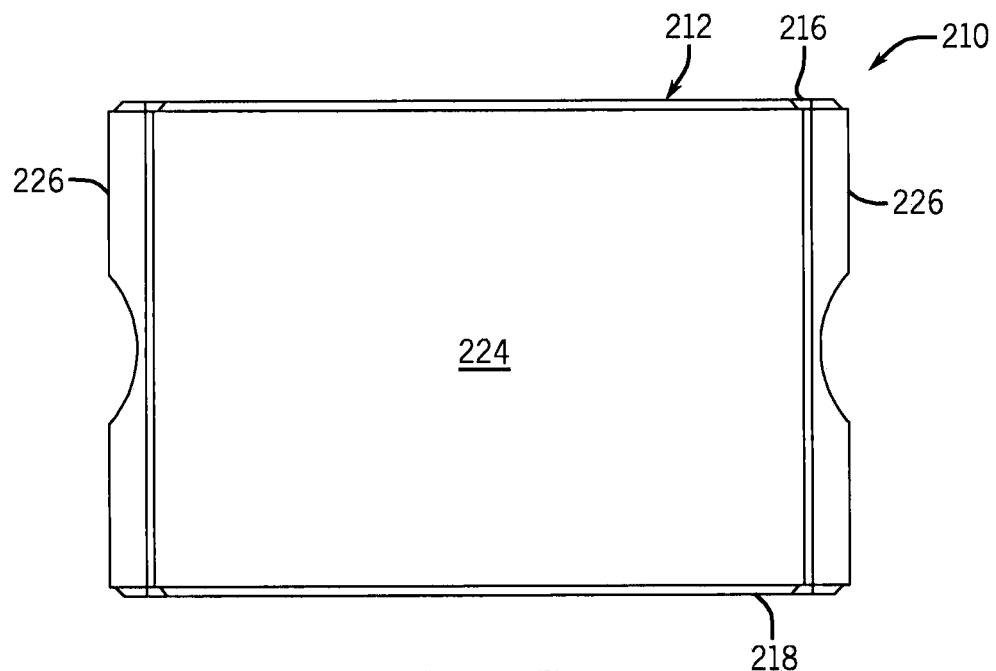
FIG. 15 is a front view of the compression limiter of FIG. 12.

The inner and outer surfaces 22, 24 are preferably arcuate surfaces or include arcuate portions to provide the overall generally open-cylindrical shape of the compression limiter 10. However, it is also contemplated that the shapes of the inner and outer surfaces 22, 24 may vary to provide a different compression limiter shape. As yet another alternative, the inner and outer surfaces 22, 24 may have an additional opening (not shown) extending from the upper surface 16 to the lower surface 18 to provide a horseshoe-shaped compression limiter 10. In a preferred embodiment, a distance between the inner and outer surfaces 22, 24, or simply the thickness of the body 12, defines a radial direction perpendicular to the longitudinal direction 20. Referring specifically to FIGS. 1 and 2, the outer surface 24 includes arcuate surfaces 32 adjacent planar surfaces 34 from which the retainers 26 project. The width of the arcuate and planar surfaces 32, 34 may be varied to change the distance between the retainers 26 as viewed in FIGS. 2 and 4.

Referring again to FIGS. 1-4, the compression limiter 10 preferably includes two retainers 26 that are diametrically opposed to one another. As such, the compression limiter 10 may have a symmetric shape over planes in the longitudinal direction 20 that bisect the compression limiter 10 (e.g., the vertical planes 42 and 44 of FIG. 2). Each retainer 26 includes an undercut surface 36 disposed between an upper retention surface 38 and a lower retention surface 40. The upper and lower retention surfaces 38, 40 are preferably planar surfaces that are perpendicular to the radial direction. As such, the upper and lower retention surfaces 38, 40 help secure the compression limiter 10 within the fastened component and prevent the compression limiter 10 from rotating relative to the fastened component. The undercut surface 36 is disposed radially inwardly relative to the retention surfaces 38, 40 and may have a arcuate shape. Alternatively, the undercut surface 36 may have a different shape that forms corners between the undercut surface 36 and the retention surfaces 38, 40 that are greater than 90 degrees (e.g., a curved shape, a diagonal surface, or the like). Such a corner is easier to manufacture than a sharp corner and reduces wear on the manufacturing tools described below.

In any case, a portion of the fastened component extends between the retention surfaces 38, 40 and engages the undercut surface 36. This helps secure the compression limiter 10 within the fastened component and prevents the compression limiter 10 from moving longitudinally relative to the fastened component. Each of the surfaces 36, 38 and 40 of the retainer 26 may have a uniform shape as viewed along the surfaces 36, 38 and 40 and in a direction perpendicular to the longitudinal direction 20. Alternatively, the undercut surface 36 may extend in a direction with only a component perpendicular to the longitudinal direction 20 (e.g., the undercut surface 36 may extend diagonally).

Each retainer 26 also includes retention edges 39 between which the retention surfaces 38, 40 are disposed. The retention edges 39 are preferably perpendicular to the retention surfaces 38, 40 and extend in the longitudinal direction 20. However, in some embodiments the retention edges 39 may extend in a direction with only a component parallel to the longitudinal direction 20 (e.g., the retention edges 39 may extend diagonally). Furthermore, the corner between each retention edge 39 and adjacent retention surfaces 40 is preferably disposed radially inwardly relative to a projection 41 of the arcuate surfaces 32 having the same radius and center as the arcuate surfaces 32. Such a feature permits the compression limiter 10 to be presented by typical automated feeding systems. In any case, the retention edges 39 help prevent the compression limiter 10 from rotating relative to the fastened component.

The aforementioned surfaces may vary from the shapes described above without departing from the scope of the invention. For example, in a second embodiment shown in FIGS. 7-11, the compression limiter 110 includes a body 112 that defines a passageway 114 as described above. The body 112 also includes an upper surface 116, a lower surface 118, an inner surface 122, and an outer surface 124 from which one or more retainers 126 project. As shown most clearly in FIGS. 10 and 11, outer shoulder surfaces 130 are spaced apart from axial surfaces 146 of the retainers 126. In addition, each retainer 126 includes an undercut surface 136 disposed between an upper retention surface 138 and a lower retention surface 140. Referring specifically again to FIGS. 10 and 11, each undercut surface 136 includes a planar surface 148 disposed between an upper arcuate surface 150 and a lower arcuate surface 152.

In a third embodiment shown in FIGS. 12-15, the compression limiter 210 includes a body 212 that defines a passageway 214 as described above. The body 212 also includes an upper surface 216, a lower surface 218, an inner surface 222, and an arcuate outer surface 224 from which one or more retainers 226 project. That is, unlike the previously-described embodiments, the outer surface 224 does not include planar surfaces from which the retainers 226 project.

Each of the embodiments described above may include additional undercut surfaces. For example, the compression limiters 10, 110, and 210 may include undercut surfaces extending along lower surfaces 18, 118, and 218, respectively.

Figure 16:
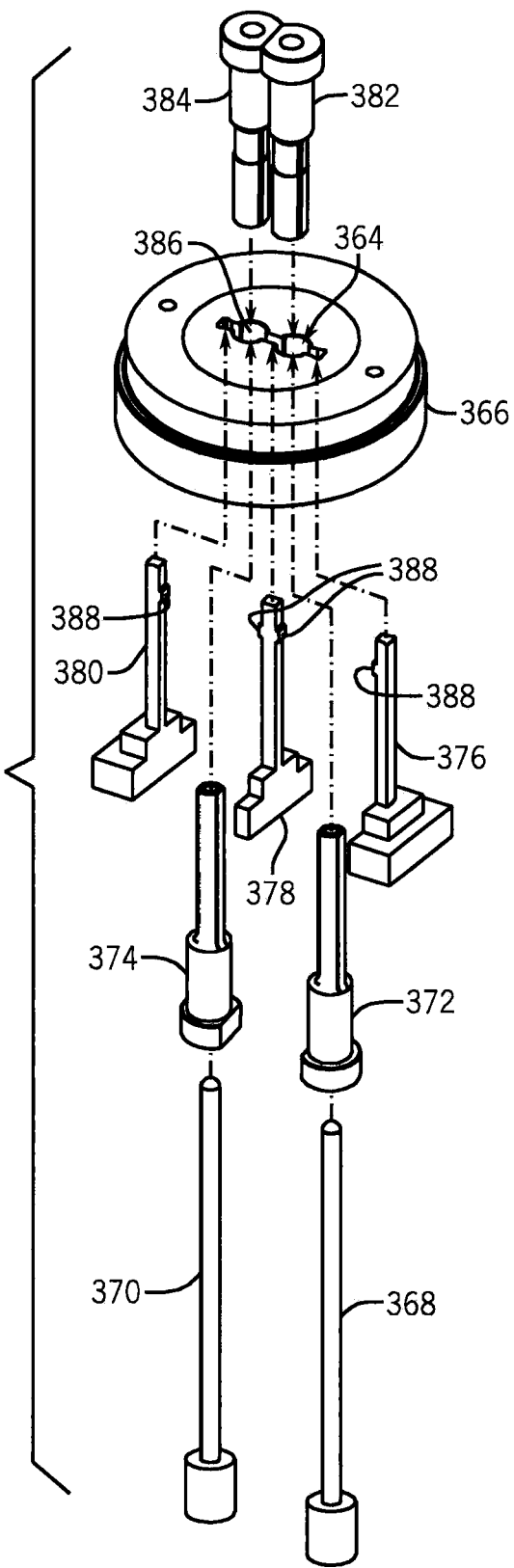
FIG. 16 is an exploded perspective view of a tooling assembly for manufacturing the compression limiter.
Figure 17:
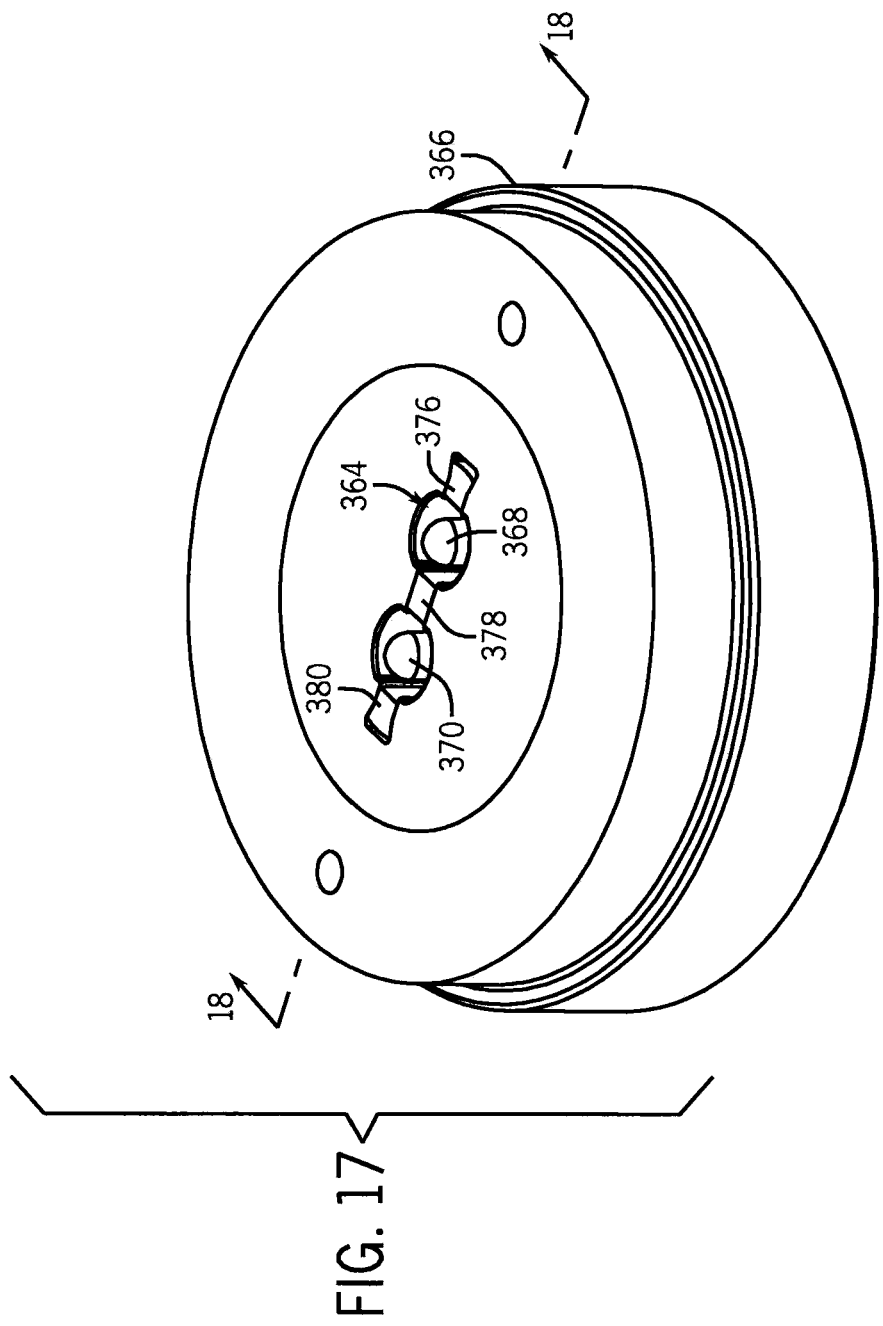
FIG. 17 is a perspective view of a first manufacturing step for the compression limiter.
Figure 18:
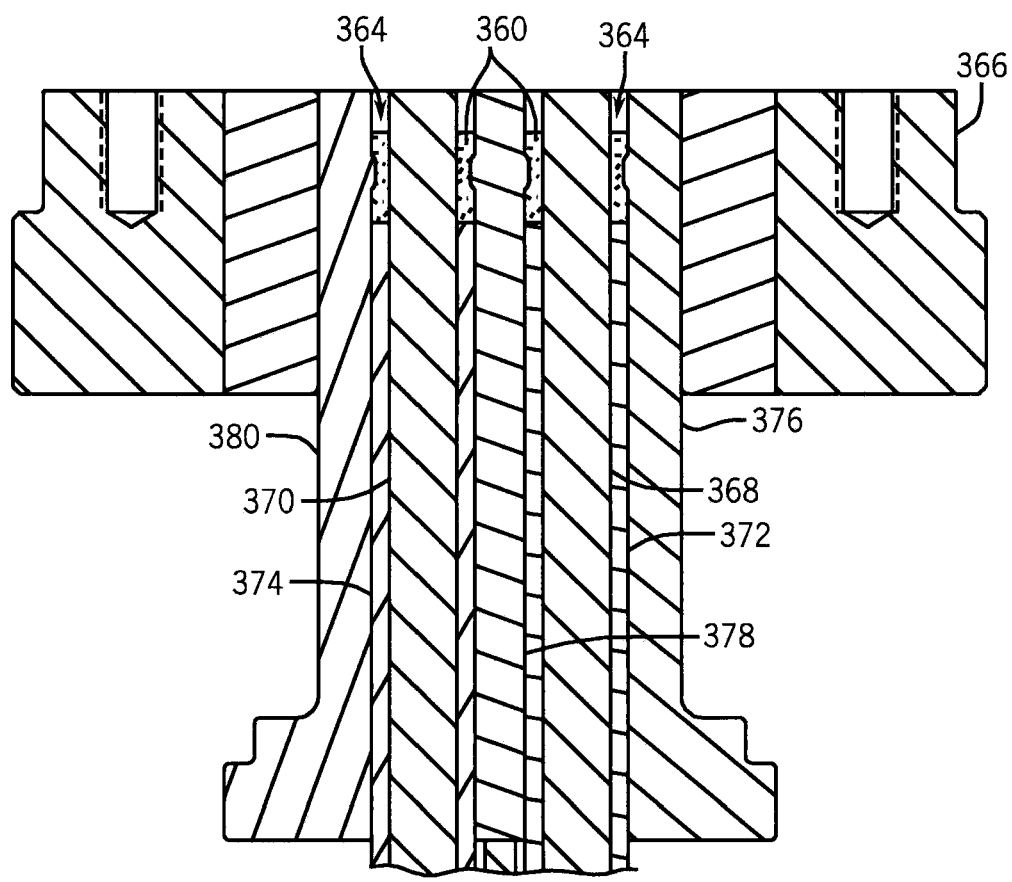
FIG. 18 is a sectional view along line 18-18 of FIG. 17.
Figure 19:
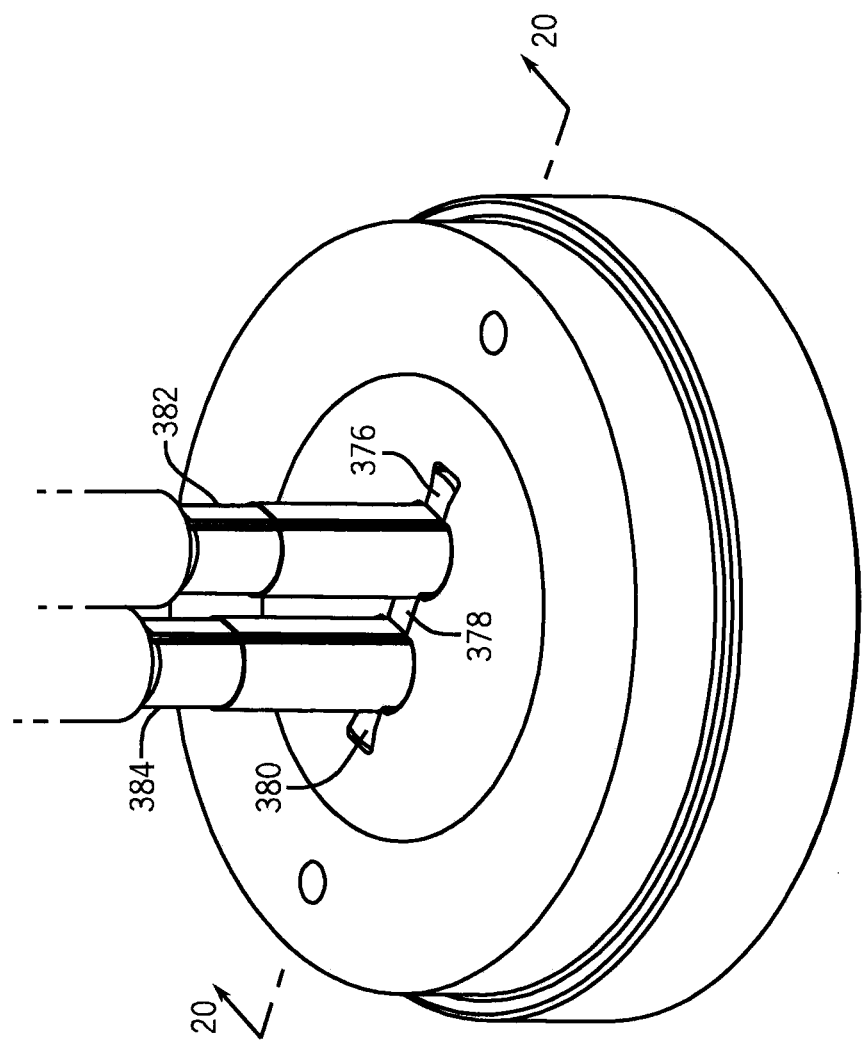
FIG. 19 is a perspective view of a second manufacturing step for the compression limiter.
Figure 20:
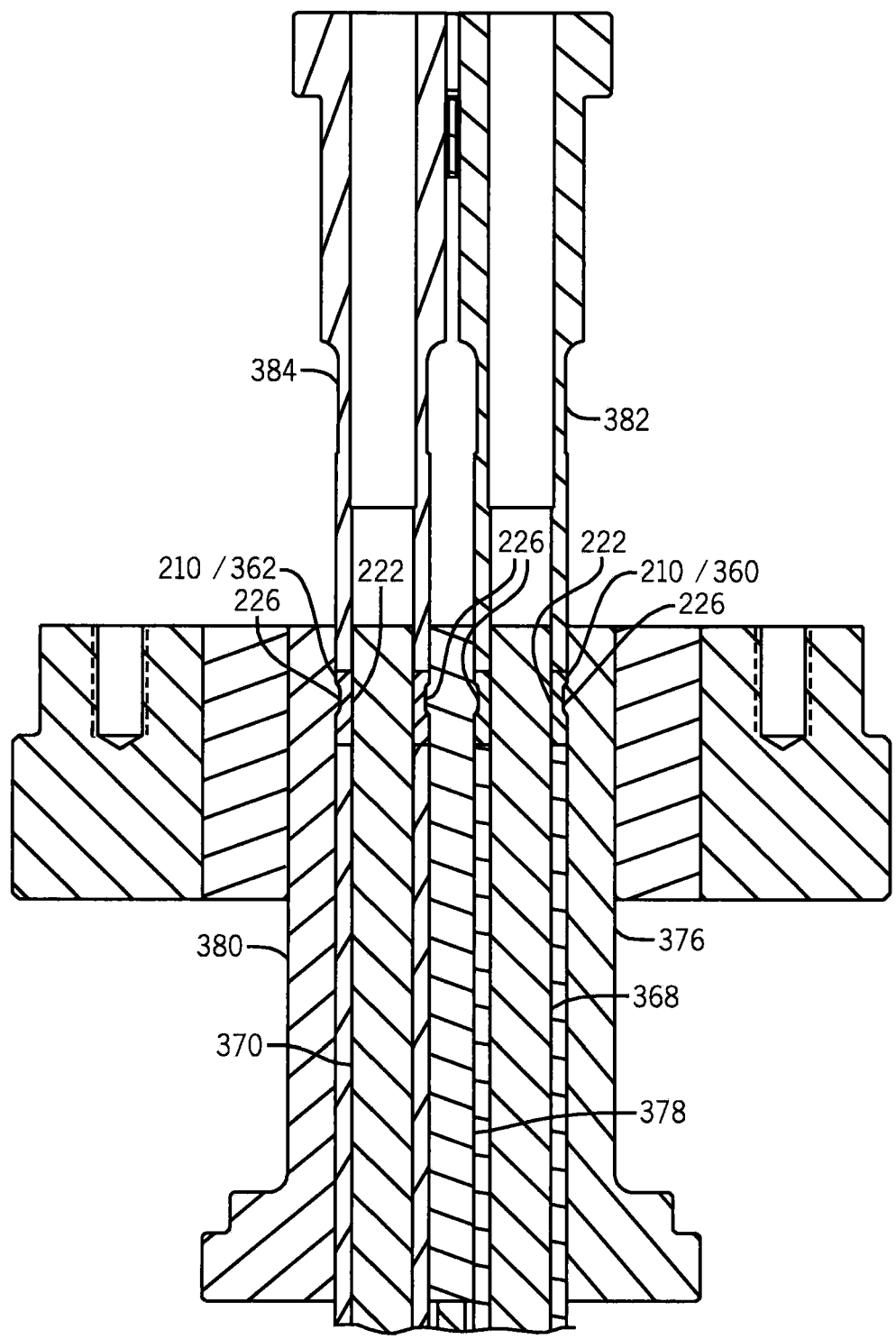
FIG. 20 is a sectional view along line 20-20 of FIG. 19.
Figure 21:
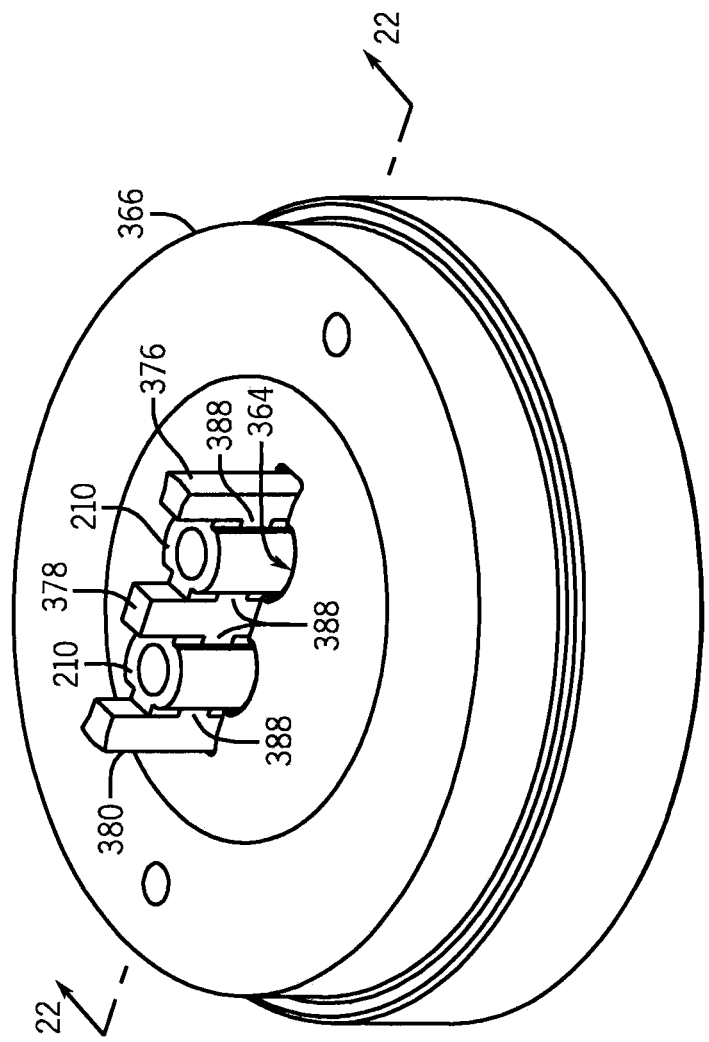
FIG. 21 is a perspective view of a third manufacturing step for the compression limiter.
Figure 22:
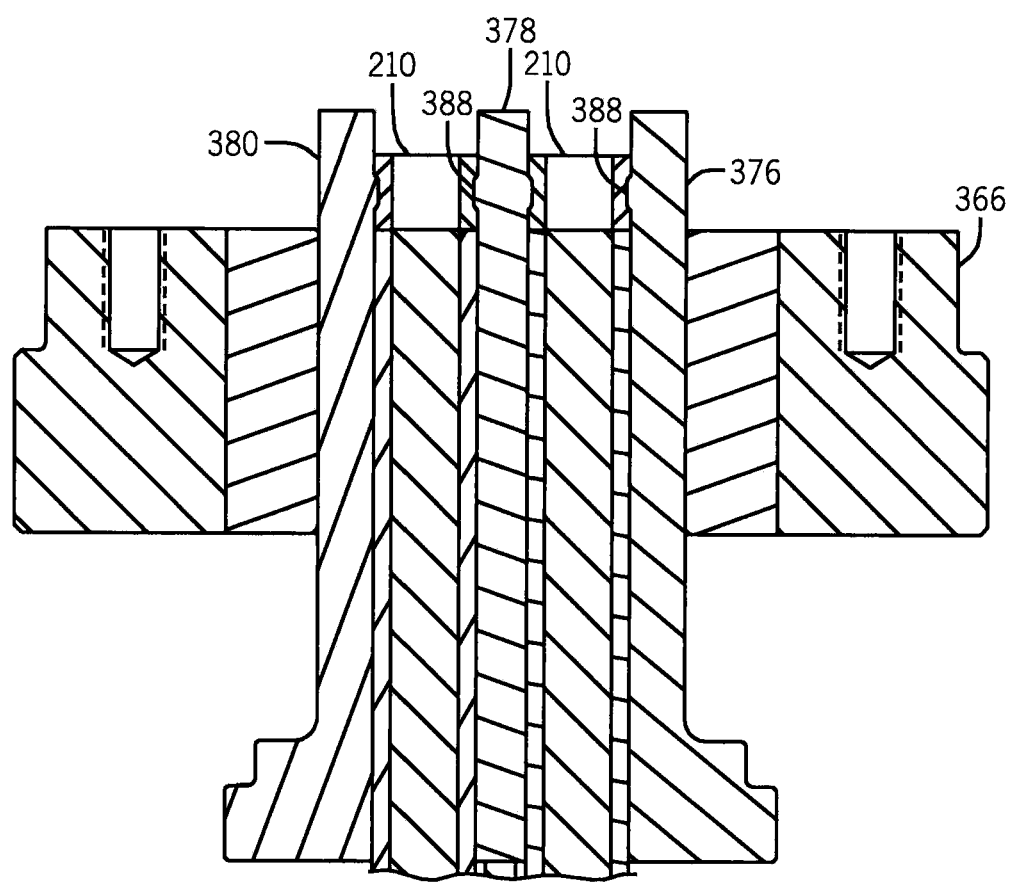
FIG. 22 is a sectional view along line 22-22 of FIG. 21.

Referring now to FIGS. 16-22, the compression limiter 210 is preferably manufactured as follows. The compression limiters 10, 110 are also preferably manufactured as follows, but only the compression limiter 210 and its features are referenced for simplicity. Referring to FIGS. 16-18, powder metal 360 (made from a carbon steel, stainless steel, aluminum alloy, bronze alloy, or the like) is filled into a die cavity 364 of a die 366. Several different components are disposed within the die cavity 364 and interact with the powder metal 360. For example, the powder metal 360 is positioned about core rods 368 and 370. The powder metal 360 is also supported by lower punches 372 and 374 (FIGS. 16 and 18). Some of the powder metal 360 is disposed between a right side punch 376 and a central punch 378. The rest of the powder metal 360 is disposed between the central punch 378 and a left side punch 380. Referring now to FIGS. 16, 19, and 20, the powder metal 360 is next pressed by the lower punches 372 and 374 and upper punches 382 and 384. This action causes an inner surface 386 of the die cavity 364 (FIG. 16) to shape the outer surfaces of the compression limiters 210. The core rods 368, 370 simultaneously shape the inner surfaces 222 of the compression limiters 210. Further still, the side punches 376, 380 and the central punch 378 simultaneously shape the retainers 226 of the compression limiters 210. Specifically, the right side punch 376 shapes a first retainer 226 on a first compression limiter 210, the central punch 378 shapes a second retainer 226 on the first compression limiter 210, the central punch 378 shapes a first retainer 226 on a second compression limiter 210, and the left side punch 380 shapes a second retainer 226 on the second compression limiter 210. As shown most clearly in FIG. 16, each of the side punches 376, 380 includes a protrusion 388 to shape an undercut surface 236 on one of the retainers 226, and the central punch 378 includes two protrusions 388 to shape an undercut surfaces 236 on each of the retainers 226. Referring now to FIGS. 16, 21, and 22, the compression limiters 210 are removed from the die cavity 364 by lowering the die 366 in the compression direction relative to the side punches 376, 380 and the central punch 378. The compression limiters 210 may be collected by sliding them laterally relative to the longitudinal direction 20 (i.e., in the direction permitted by the protrusions 388). Finally, a coating may be applied to the compression limiters 210, such as a zinc and clear chromate coating as provided by ASTM B633 type 3 class 1 or the like.

Those skilled in the art will appreciate changes to the apparatus described above that permit three or more compression limiters 210 to be manufactured during each cycle. Furthermore, those skilled in the art may appreciate that the compression limiter 210 may be formed by a simplified process wherein a single compression limiter 210 is manufactured during each cycle. However, it is preferred to manufacture two or more compression limiters 210 during each cycle so that the net transverse load applied to the die 366 is reduced. That is, a single upper punch may apply a transverse load (e.g., towards one of the side punches 376, 380) in addition to the load in the compression direction. The transverse load must be resisted by the die 366 and can cause wear on the punches and the die 366. However, the transverse loads applied by two or more upper punches 382, 384 operating simultaneously may cancel each other and thereby reduce the net transverse load applied to the die 366.

From the above disclosure, it should be apparent that the present invention provides a compression limiter with retention features that resist both translational and rotational motion. In addition, the compression limiter is easily shaped in a single tooling assembly.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. A compression limiter, comprising:
   an upper surface for bearing a compressive load that is resisted by the compression limiter;
   a lower surface for bearing the compressive load that is resisted by the compression limiter, a distance between the lower surface and the upper surface defining a longitudinal direction;
   an inner surface defining a passageway running in the longitudinal direction between the upper surface and the lower surface, the passageway being configured to accommodate a fastener therethrough;
   an outer surface configured to engage a structure in which the compression limiter is placed, a distance between the outer surface and the inner surface defining a radial direction perpendicular to the longitudinal direction;
   a first retainer projecting outwardly from the outer surface, the first retainer including:
     a first retention surface having at least a planar portion perpendicular to the radial direction; and
     an undercut surface disposed radially inwardly from the first retention surface so as to create a corner extending in a direction with at least a component perpendicular to the longitudinal direction.

2. The compression limiter of claim 1, wherein the first retainer includes a corner between the undercut surface and the first retention surface having an angle greater than 90 degrees.

3. The compression limiter of claim 1, wherein the inner surface has a generally cylindrical shape.

4. The compression limiter of claim 1, wherein the first retainer further includes a second retention surface having at least a planar portion perpendicular to the radial direction, the undercut surface being disposed between the first retention surface and the second retention surface.

5. The compression limiter of claim 1, wherein the undercut surface has a uniform shape as viewed along the undercut surface and in a direction perpendicular to the longitudinal direction.

6. The compression limiter of claim 1, wherein the outer surface includes an arcuate surface and a planar surface at which the first retainer is positioned, the planar surface being adjacent to the arcuate surface.

7. The compression limiter of claim 1, further comprising a second retainer projecting radially outwardly from the outer surface, the second retainer including:
   a first retention surface having at least a planar portion perpendicular to the radial direction; and
   an undercut surface disposed radially inwardly from the first retention surface of the second retainer so as to create a corner extending in a direction with at least a component perpendicular to the longitudinal direction.

8. The compression limiter of claim 7, wherein the first and second retainers are diametrically opposed.

9. The compression limiter of claim 8, wherein the compression limiter is symmetric about a plane that bisects the outer arcuate surfaces in the longitudinal direction.

10. The compression limiter of claim 8, wherein the compression limiter is symmetric about a plane that bisects the outer arcuate surfaces in the radial direction.

11. The compression limiter of claim 1, further comprising a surface coating including zinc.

12. A compression limiter, comprising:
   an upper surface for bearing a compressive load that is resisted by the compression limiter;
   a lower surface for bearing the compressive load that is resisted by the compression limiter, a distance between the lower surface and the upper surface defining a longitudinal direction;
   an inner surface defining a passageway running in the longitudinal direction between the upper surface and the lower surface, the passageway being configured to accommodate a fastener;
   an outer surface configured to engage a structure in which the compression limiter is placed, a distance between the outer surface and the inner surface defining a radial direction perpendicular to the longitudinal direction;
   a first retainer projecting outwardly from the outer surface, the first retainer including:
      a first retention surface having at least a planar portion perpendicular to the radial direction;
      an undercut surface disposed radially inwardly from the first retention surface so as to create a corner extending in a direction with at least a component perpendicular to the longitudinal direction; and
      a first retention edge adjacent the first retention surface, the first retention edge extending in a direction with at least a component parallel to the longitudinal direction.

13. The compression limiter of claim 12, wherein the outer surface includes an arcuate surface and a planar surface from which the first retainer projects, the planar surface being disposed between the arcuate surface and the first retention edge, and wherein the first retainer includes a second corner between the first retention surface and the first retention edge, the second corner being disposed radially inwardly relative to a projection of the arcuate surface of the same radius and center as the arcuate surface.

14. The compression limiter of claim 12, wherein the first retainer includes a corner between the undercut surface and the first retention surface having an angle greater than 90 degrees.

15. The compression limiter of claim 12, wherein the first retainer further includes a second retention surface having at least a planar portion perpendicular to the radial direction, the undercut surface being disposed between the first retention surface and the second retention surface.

16. The compression limiter of claim 15, wherein the first retainer further includes a second retention edge extending in a direction with at least a component parallel to the longitudinal direction, the first and second retention surfaces being disposed between the first and second retention edges.

17. The compression limiter of claim 15, wherein the outer surface includes an arcuate surface and a planar surface from which the first retainer projects, the planar surface being disposed between the arcuate surface and the first retention edge.

* * * * *